(12) United States Patent
Chitiveli et al.

(10) Patent No.: US 8,140,540 B2
(45) Date of Patent: Mar. 20, 2012

(54) CLASSIFICATION OF ELECTRONIC MESSAGES BASED ON CONTENT

(75) Inventors: Srinivas V. Chitiveli, Germantown, MD (US); Barton W. Emanuel, Manassas, VA (US); Alexander W. Holt, New Paltz, NY (US); Michael E. Moran, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/404,716

(22) Filed: Mar. 16, 2009

(65) Prior Publication Data

US 2010/0235367 A1 Sep. 16, 2010

(51) Int. Cl.
G06F 7/00 (2006.01)
G06F 17/30 (2006.01)
(52) U.S. Cl. .................. 707/748; 707/752; 707/771
(58) Field of Classification Search .................. 707/748, 707/749, 752, 771
See application file for complete search history.

(56) References Cited

U.S. PATENT DOCUMENTS

| | | | |
|---|---|---|---|
| 5,377,354 A | 12/1994 | Scannell et al. | |
| 5,694,616 A | 12/1997 | Johnson et al. | |
| 5,948,058 A | 9/1999 | Kudoh et al. | |
| 6,195,657 B1 | 2/2001 | Rucker et al. | |
| 6,202,058 B1 | 3/2001 | Rose et al. | |
| 6,400,810 B1 | 6/2002 | Skladman et al. | |
| 6,411,947 B1 | 6/2002 | Rice et al. | |
| 6,587,549 B1 | 7/2003 | Weik | |
| 6,654,791 B1 | 11/2003 | Bates et al. | |
| 6,721,402 B2 | 4/2004 | Usami | |
| 6,832,245 B1 | 12/2004 | Isaacs et al. | |
| 7,120,865 B1 | 10/2006 | Horvitz et al. | |
| 7,158,986 B1 | 1/2007 | Oliver et al. | |
| 7,178,099 B2 | 2/2007 | Meyer et al. | |
| 7,237,009 B1 | 6/2007 | Fung et al. | |
| 7,359,936 B2 | 4/2008 | Gruen et al. | |
| 2003/0158855 A1 | 8/2003 | Farnham et al. | |
| 2004/0133649 A1 | 7/2004 | Kim | |
| 2004/0230570 A1* | 11/2004 | Hatta et al. | 707/3 |
| 2006/0080320 A1* | 4/2006 | Chu et al. | 707/10 |
| 2007/0156732 A1 | 7/2007 | Surendran et al. | |
| 2007/0288457 A1* | 12/2007 | Aravamudan et al. | 707/5 |
| 2008/0065736 A1 | 3/2008 | Gross | |
| 2008/0256054 A1* | 10/2008 | Saaty | 707/5 |
| 2009/0150497 A1* | 6/2009 | McAfee et al. | 709/206 |

* cited by examiner

*Primary Examiner* — Phong Nguyen
(74) *Attorney, Agent, or Firm* — Patterson & Sheridan, LLP

(57) ABSTRACT

Classifying electronic mail (e-mail) based on content and predefined categories. Content of a received e-mail may be analyzed to determine one of a plurality of predefined categories into which the e-mail is classified. A relevancy score may also be calculated to indicate the strength of correlation between the e-mail and the category. A user may be allowed to sort e-mails in an e-mail box based on the category names and/or relevancy scores.

21 Claims, 5 Drawing Sheets

| 410 DATE | 420 FROM | 430 SUBJECT | 400 | 440 CATEGORY | 450 RELEVANCY SCORE |
|---|---|---|---|---|---|
| 1/28/2009 | JOE | FIRST OFFICE ACTION | | PATENT APPLICATION | 98 |
| 1/27/2009 | SIMON | REHEARSAL DINNER | | JASON'S WEDDING | 95 |
| 2/2/2009 | JILL | LAYOUT DIAGRAM | | DRAM PROJECT | 89 |
| 1/29/2009 | BILL | RECOMMENDATION | | PATENT APPLICATION | 83 |
| 2/3/2009 | YOLANDA | WEDDING SHOWER | | JASON'S WEDDING | 77 |
| 1/31/2009 | CHRIS | HAPPY HOUR | | JASON'S WEDDING | 67 |
| 2/1/2009 | JIM | STATUS | | PATENT APPLICATION | 40 |
| 2/4/2009 | LIZ | RESPONSE FILED | | PATENT APPLICATION | 30 |

| CATEGORY NAME | TAGS |
|---|---|
| DRAM PROJECT | MEMORY, RAS, CAS, ENABLE SIGNAL, CONTROLLER |
| JASON'S WEDDING | BRIDE, GROOM, CHRISTINA, JASON, JANUARY 17TH, GROOMSMEN, RECEPTION |
| PATENT APPLICATION | USPTO, OFFICE ACTION, REJECTION, REFERENCES, SMITH ET. AL. |

FIG. 3

| 410 DATE | 420 FROM | 430 SUBJECT | 400 | 440 CATEGORY | 450 RELEVANCY SCORE |
|---|---|---|---|---|---|
| 1/27/2009 | SIMON | REHEARSAL DINNER | | JASON'S WEDDING | 95 |
| 1/28/2009 | JOE | FIRST OFFICE ACTION | | PATENT APPLICATION | 98 |
| 1/29/2009 | BILL | RECOMMENDATION | | PATENT APPLICATION | 83 |
| 1/31/2009 | CHRIS | HAPPY HOUR | | JASON'S WEDDING | 67 |
| 2/1/2009 | JIM | STATUS | | PATENT APPLICATION | 40 |
| 2/2/2009 | JILL | LAYOUT DIAGRAM | | DRAM PROJECT | 89 |
| 2/3/2009 | YOLANDA | WEDDING SHOWER | | JASON'S WEDDING | 77 |
| 2/4/2009 | LIZ | RESPONSE FILED | | PATENT APPLICATION | 30 |

FIG. 4

| 410 DATE | 420 FROM | 430 SUBJECT | 400 | 440 CATEGORY | 450 RELEVANCY SCORE |
|---|---|---|---|---|---|
| 1/28/2009 | JOE | FIRST OFFICE ACTION | | PATENT APPLICATION | 98 |
| 1/27/2009 | SIMON | REHEARSAL DINNER | | JASON'S WEDDING | 95 |
| 2/2/2009 | JILL | LAYOUT DIAGRAM | | DRAM PROJECT | 89 |
| 1/29/2009 | BILL | RECOMMENDATION | | PATENT APPLICATION | 83 |
| 2/3/2009 | YOLANDA | WEDDING SHOWER | | JASON'S WEDDING | 77 |
| 1/31/2009 | CHRIS | HAPPY HOUR | | JASON'S WEDDING | 67 |
| 2/1/2009 | JIM | STATUS | | PATENT APPLICATION | 40 |
| 2/4/2009 | LIZ | RESPONSE FILED | | PATENT APPLICATION | 30 |

FIG. 5

| 410 DATE | 420 FROM | 430 SUBJECT | 400 | 440 CATEGORY | 450 RELEVANCY SCORE |
|---|---|---|---|---|---|
| 2/2/2009 | JILL | LAYOUT DIAGRAM | | DRAM PROJECT | 89 |
| 1/27/2009 | SIMON | REHEARSAL DINNER | | JASON'S WEDDING | 95 |
| 1/31/2009 | CHRIS | HAPPY HOUR | | JASON'S WEDDING | 67 |
| 2/3/2009 | YOLANDA | WEDDING SHOWER | | JASON'S WEDDING | 77 |
| 1/28/2009 | JOE | FIRST OFFICE ACTION | | PATENT APPLICATION | 98 |
| 1/29/2009 | BILL | RECOMMENDATION | | PATENT APPLICATION | 83 |
| 2/1/2009 | JIM | STATUS | | PATENT APPLICATION | 40 |
| 2/4/2009 | LIZ | RESPONSE FILED | | PATENT APPLICATION | 30 |

FIG. 6

| 410 DATE | 420 FROM | 430 SUBJECT | 400 | 440 CATEGORY | 450 RELEVANCY SCORE |
|---|---|---|---|---|---|
| 2/2/2009 | JILL | LAYOUT DIAGRAM | | DRAM PROJECT | 89 |
| 1/27/2009 | SIMON | REHEARSAL DINNER | | JASON'S WEDDING | 95 |
| 2/3/2009 | YOLANDA | WEDDING SHOWER | | JASON'S WEDDING | 77 |
| 1/31/2009 | CHRIS | HAPPY HOUR | | JASON'S WEDDING | 67 |
| 1/28/2009 | JOE | FIRST OFFICE ACTION | | PATENT APPLICATION | 98 |
| 1/29/2009 | BILL | RECOMMENDATION | | PATENT APPLICATION | 83 |
| 2/1/2009 | JIM | STATUS | | PATENT APPLICATION | 40 |
| 2/4/2009 | LIZ | RESPONSE FILED | | PATENT APPLICATION | 30 |

FIG. 7

CLASSIFICATION OF ELECTRONIC MESSAGES BASED ON CONTENT

BACKGROUND OF THE INVENTION

1. Field of the Invention

The present invention generally relates to data processing, and more specifically to processing electronic mail.

2. Description of the Related Art

Electronic mail (e-mail) is a widespread form of communication between users of computerized devices. Typically, e-mails are composed and sent using an e-mail client application. A given e-mail message may include payload in the form of text or in-line figures, as well as attachments (e.g. documents, pictures, video files, and the like).

As reliance on e-mails in various environments grows, the number of e-mails received and stored in a person's e-mail account may also grow. In some cases such as, for example, e-mail accounts of corporate executives, potentially hundreds of e-mails may be received each day. As a result, the efficient management of e-mails is important to many users and can be very time-consuming.

SUMMARY OF THE INVENTION

The present invention generally relates to data processing, and more specifically to processing electronic mail.

One embodiment of the invention provides a computer-implemented method for classifying an electronic message. The method generally comprises configuring one or more computer processors with an electronic message program to perform an operation. The operation comprises, for each category in a predefined list of categories, determining whether a body of the electronic message comprises one or more key words associated with the category, and calculating a relevancy score based on the one or more key words, wherein the relevancy score indicates a correlation between the electronic message and the category. The operation further comprises determining a category having a strongest correlation with the electronic message based on calculated relevancy scores, and associating the electronic message with the category having the strongest correlation therewith. The operation further comprises dynamically changing the relevancy score of the category having the strongest correlation in response to receiving a predefined user action associated with the electronic message.

Another embodiment of the invention provides a computer program product for classifying electronic messages, the computer program product comprising a computer readable storage medium having computer usable program code. The program code is configured to, for each category in a predefined list of categories determine whether a body of the electronic message comprises one or more key words associated with the category, and calculate a relevancy score based on the one or more key words, wherein the relevancy score indicates a correlation between the electronic message and the category. The program code is also configured to determine a category having a strongest correlation with the electronic message based on calculated relevancy scores, and associate the electronic message with the category having the strongest correlation therewith. The program code is further configured to dynamically changing the relevancy score of the category having the strongest correlation in response to receiving a predefined user action associated with the electronic message.

Yet another embodiment of the invention provides a system, comprising a memory comprising an electronic message program and at least one processor. The processor, when executing the electronic message program is generally configured to, for each category in a predefined list of categories, determine whether a body of an electronic message comprises one or more key words associated with the category, and calculate a relevancy score based on the one or more key words, wherein the relevancy score indicates a correlation between the electronic message and the category. The processor is also configured to determine a category having a strongest correlation with the electronic message based on calculated relevancy scores, and associate the electronic message with the category having the strongest correlation therewith. The processor is further configured to dynamically change the relevancy score of the category having the strongest correlation in response to receiving a predefined user action associated with the electronic message.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates exemplary categories for classifying e-mails, according to an embodiment of the invention.

FIGS. 4-7 illustrate an exemplary e-mail box according to an embodiment of the invention.

DETAILED DESCRIPTION OF THE PREFERRED EMBODIMENTS

Figure 1:
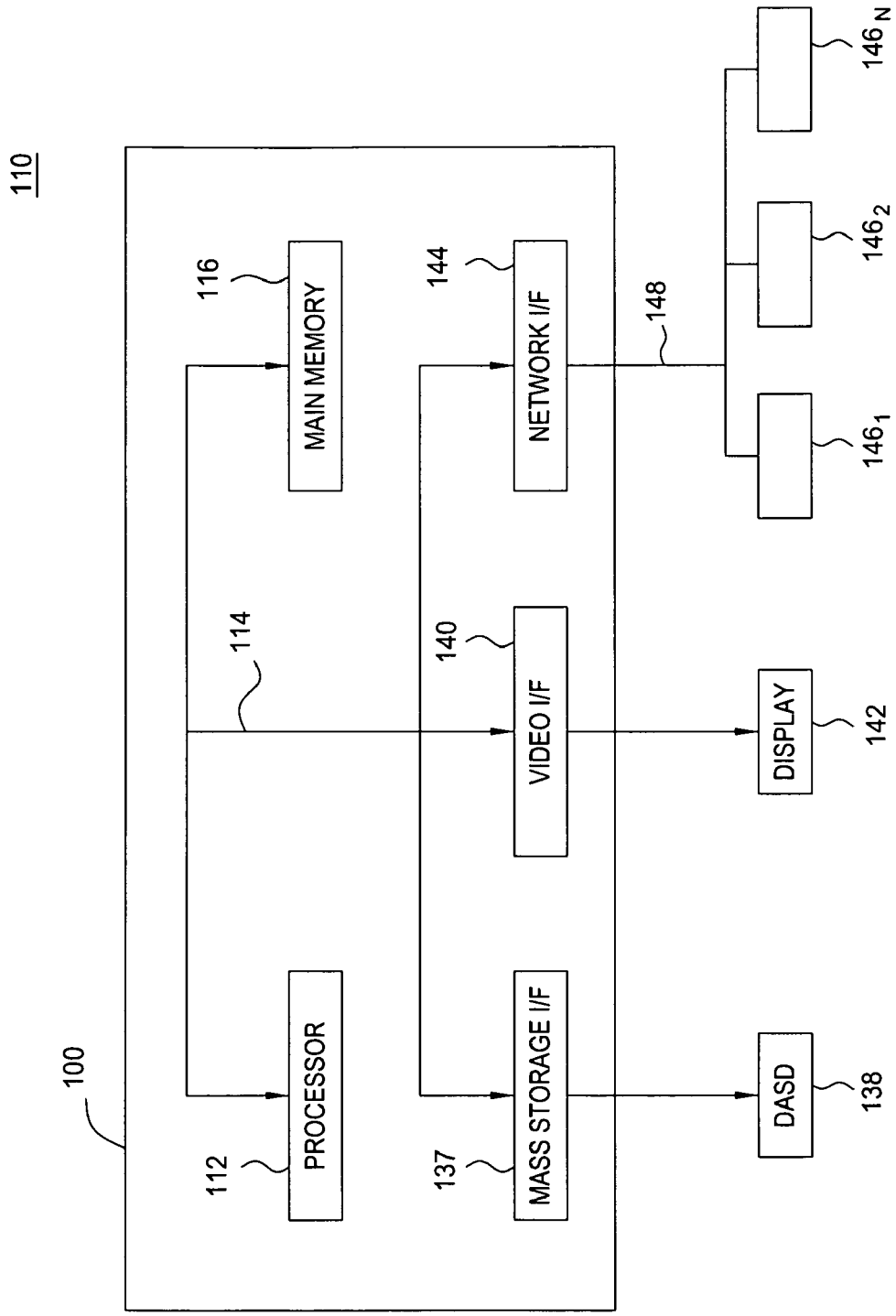
FIG. 1 illustrates a computerized apparatus configurable according to an embodiment of the invention.

The present invention generally relates to data processing, and more specifically to processing electronic mail (e-mail). Content of a received e-mail may be analyzed to determine one of a plurality of predefined categories into which the e-mail is classified. A relevancy score may also be calculated to indicate the strength of correlation between the e-mail and the category. A user may be allowed to sort e-mails in an e-mail box based on the category names and/or relevancy scores.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 shows a computer 100 (which is part of a computer system 110) that becomes a special-purpose computer according to an embodiment of the invention when configured with the features and functionality described herein. The computer system 100 may represent any type of computer, computer system or other programmable electronic device, including a client computer, a server computer, a portable computer, a personal digital assistant (PDA), a cell phone, an embedded controller, a PC-based server, a minicomputer, a midrange computer, a mainframe computer, and other computers adapted to support the methods, apparatus, and article of manufacture of the invention. The terms client computer and server computer are used herein merely for convenience in describing embodiments and in general may refer to any computer, including a computer containing both client-type software and server-type software.

Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet). Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

Figure 2:
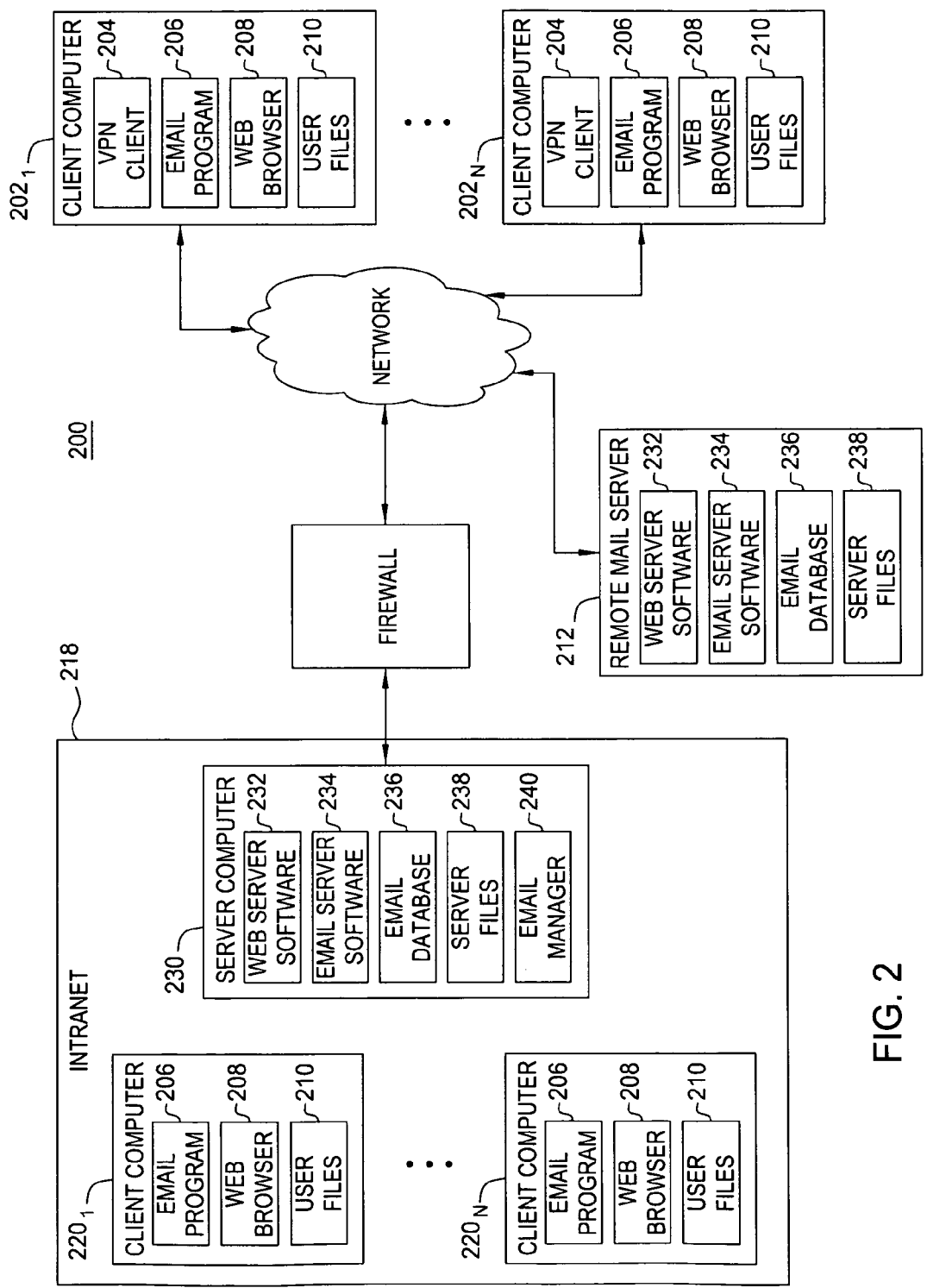
FIG. 2 illustrates an exemplary system according to an embodiment of the invention.

FIG. 2 depicts an exemplary networked environment 200 in which e-mail messages may be transmitted according to embodiments of the present invention. The networked environment 200 may comprise an intranet 218, a network 216, a remote mail server 212, and a plurality of client computers 2021 . . . 202N which may be outside of the intranet 218. The intranet 218 may contain a plurality of client computers 2201 . . . 220N as well as a server computer 230. Each computer in the intranet 218 may be connected to the network 216 by a firewall 214. Intranet 218 may be any network, including, for example, a corporate/office/enterprise intranet, university intranet, or home/personal intranet. Network 216 may also be any network, including a large wide-area network (WAN) such as the Internet. Each client computer 2021 . . . 202N and 2201 . . . 220N may be a computer system (e.g. the computer system 110 depicted in FIG. 1). The client computers 2021 . . . 202N and 2201 . . . 220N may be connected to one another through the network 216 and intranet 218 and also connected through the intranet 218 and network 216 to the server computer 230 and remote mail server 212.

Each of the servers 212, 230 may provide a variety of e-mail services to each of the client computers 2021 ... 202N and 2201 ... 220N. These e-mail services may be provided on a variety of different scales. For instance, the provided e-mail services may include large Internet services such as Yahoo! Mail™ or Hotmail™. The e-mail services may also include mid-size and smaller e-mail services, such as enterprise level, corporate or business e-mail services, university e-mail services, and home or personally run e-mail services.

In some cases, the servers 212, 230 may provide e-mail services in one or more protocols. The provided e-mail protocols may include the Post Office Protocol (POP, including, for instance, versions POP2 or POP3), the Simple Mail Transfer Protocol (SMTP), and Internet Message Access Protocol (IMAP), as well as any other appropriate protocol.

According to one embodiment of the invention, each server 212, 230 may have e-mail server software 234 which implements each provided protocol and provides e-mail services to each of the clients. In one embodiment, each client computer 2021 ... 202N and 2201 ... 220N may access the e-mail services provided by the e-mail server software 234 using an e-mail program 206. When the e-mail server software 234 receives an access request (e.g., a request to check, read, or send e-mail) from the e-mail program 206, the e-mail server software 234 may access an e-mail database 236 and use information within the e-mail database 236 to process the request. The e-mail database 236 may include any information, including sent e-mail messages, sent e-mail attachments, drafted messages, received e-mail messages, received e-mail attachments, user information, and any other information used by the e-mail server software 234. In one embodiment of the invention, the e-mail database may include metadata that may be used to categorize e-mails, as is discussed in greater detail below.

In some cases, each client computer 2021 ... 202N and 2201 ... 220N may also store e-mail information (e.g., in local user files 210) which may include e-mail messages, e-mail attachments and/or cached copies of e-mail information stored in a remote e-mail database 236. The e-mail information in local user files 210 may also include information regarding the respective user's habits relating to e-mail, as will be described in more detail below.

Client computers 2021 ... 202N and 2201 ... 220N depicted in FIG. 2 may access the e-mail services provided by each of the server computers 212, 230 using a variety of access methods and configurations. Where client computers 2201 ... 220N are located within intranet 218, the client computers 2201 ... 220N may connect directly to the server computer 230 within the intranet 218 with an e-mail program 206 configured to access the server computer 230. The e-mail program 206 may use one or more of the protocols described above to access the e-mail server software 234.

Where client computers 2021 ... 202N outside of an intranet 218 access computers 230, 2201 ... 220N inside the intranet 218, the external client computers 2021 ... 202N may use a virtual private network (VPN) to create a connection. The VPN may be accessed by the client computers 2021 ... 202N using a VPN client 204. Thus, in some cases, the VPN client 204 may be used in conjunction with the e-mail program 206 to access the e-mail services provided by the e-mail server software 234 on the server computer 230. In other cases, where client computers 2021 ... 202N and 2201 ... 220N access a remote mail server 212 which is not within an intranet 218, the mail services provided by the server computer 212 may be accessed without the VPN client 204. In other embodiments, the VPN client may not be used to access either server computer 212, 230.

Each of the servers 212, 230 may also provide e-mail services using a web based e-mail service (also referred to as a webmail service, or Internet mail service). The web based e-mail service may be implemented using web server software 232 on each server computer 212, 230 which provides each client computer 2021 ... 202N and 2201 ... 220N a series of web pages. According to one embodiment of the invention, each client computer 2021 ... 202N and 2201 ... 220N may use web browser software 208 or the e-mail program 206 to access the web based e-mail service. Each client computer 2021 ... 202N and 2201 ... 220N may access the web based e-mail services provided by the server computers 212, 230 using a variety of protocols, including the Hypertext Transfer Protocol (HTTP), File Transfer Protocol (FTP), Gopher, Telnet, The web pages provided by the web server software 230 may be used to access e-mail services provided by the server computer 212, 230. Accordingly, the web pages may utilize one or more forms, such as Hypertext Markup Language (HTML) forms, and/or one or more scripts and/or applets to process requests from client computers 2021 ... 202N and 2201 ... 220N. The scripts used to access the e-mail services may include scripts executed by the server computers 212, 230. Scripts executed by the server computers 212, 230 (referred to as server-side scripts) may be executed, for example, by the web server software 232, e-mail server software 234, or other server software. The scripts used to access the e-mail services may also include scripts executed by the client computers 2021 ... 202N and 2201 ... 220N (referred to as client-side scripts) and may be executed, for example, by the e-mail program 206, web browser 208, or other client software.

Networked environment 200 is merely an exemplary networked environment and other configurations, variations, and components of the networked environment (such as routers, storage servers, file servers, etc. ..., not depicted) should be readily apparent to one of ordinary skill in the art. For instance, in some embodiments, multiple separate computers may be used as web and e-mail servers, with one or more computers executing for the web server software 232 and one or more computers executing e-mail server software 234. In some cases, each e-mail service may provide several e-mail domains wherein a separate e-mail server provides e-mail service to each domain and wherein an e-mail router is used to route all e-mail received by the e-mail service to the appropriate e-mail server. In general, embodiments of the invention may be adapted for use in any situation in which electronic messages are transmitted.

Embodiments of the invention are not limited to the client-server model described hereinabove. Advantages of the invention may also be realized in alternative arrangements and networks of computer systems such as, for example, peer-to-peer (P2P) networks. Furthermore, embodiments of the invention are described herein with reference to e-mail messages for illustrative purposes only. In alternative embodiments, advantages of the invention may be realized with respect to any type of electronic message including, for example, text messages, instant messages, or the like.

Regardless of the particular architecture, supporting electronic mail requires sufficient resources, including sufficient processing and storage resources. In one embodiment, such management is performed by an e-mail manager. Illustratively, FIG. 2 shows an e-mail manager 240 resident on the server computer 230. However, the e-mail manager 240, or other instances of an e-mail manager, may be resident on the remote mail server 212 and/or on the various client computers 2021 ... 202N and 2201 ... 220N. In another embodiment, one or more agents may reside on the various client computers 2021 ... 202N and 2201 ... 220N cooperate with e-mail managers to implement embodiments of the invention.

E-mails have become one of the most effective ways to communicate between large groups of people. For example, most businesses today use e-mails as a means for communicating with employees, customers, vendors, and the like. With the proliferation of e-mail as a communication tool, users have started to see a large number of e-mails flood their e-mail boxes. In many cases, the large number of e-mails may include spam or other undesired or irrelevant messages, which may make it difficult for the user to quickly find and read desired or critical e-mails in their e-mail box. Retrieving relevant e-mails from an e-mail box efficiently may be crucial to some users such as executives of a corporation.

As an example, assume that a corporate executive such as a Chief Executive Officer (CEO) takes a vacation for a week, during which he does not check his e-mail box. The CEO is likely to receive a large number of e-mails during his vacation week, which may include crucial e-mails regarding corporate decisions that he must make as well as spam and other irrelevant or non-crucial e-mails. When the CEO returns from vacation, he/she may want to quickly review the most important e-mails such as e-mails that inform him of a time critical action that must be taken.

E-mails generally include a body comprising a message and metadata describing the e-mail. The metadata may include, for example, the name of the sender, the names of one or more recipients, date, time, subject of the e-mail, and the like. Some e-mail clients allow users to sort e-mails using the metadata, which may allow users to retrieve relevant e-mails from a long list of e-mails. For example, the CEO in the above example may sort the e-mails by sender names or by subject line, which may allow him to locate certain desired crucial e-mails.

However, sorting e-mails using abstract metadata such as sender names and subject lines may still result in undesired and irrelevant e-mails being presented to the user. For example, suppose the CEO in the above example expects crucial e-mails from a particular sender. Accordingly, the CEO may sort his e-mails by sender name to quickly identify crucial e-mails that were received from the particular sender. However, it is possible that the sender may have sent the CEO irrelevant and non-crucial e-mails. For example, the sender may have sent the CEO an e-mail inviting the CEO to the sender's birthday party, which is unrelated to the business of the corporation. Reviewing such non-critical e-mails may take up significant amounts of time, which may prevent or delay the CEO from completing critical business related tasks that are communicated via e-mail.

In some cases, even if the subject line of the e-mail indicates that the e-mail is a critical e-mail, the e-mail may in fact turn out to be not critical. For example, an e-mail may indicate that it is related to a high priority project. However, upon opening the e-mail, the CEO may realize that the e-mail was actually about a team lunch for project members that was organized during his vacation. Therefore, e-mail metadata that is not derived from the e-mail body may not adequately educate a user regarding the content of the e-mail.

Embodiments of the invention allow users to categorize e-mails based on their content, thereby allowing users to quickly and efficiently identify desired e-mails. In one embodiment of the invention, the e-mail database 236 may include one or more predefined taxonomies, each taxonomy including one or more predefined categories for organizing e-mails. For example, a corporation may include a corporate or enterprise taxonomy that may include categories for one or more corporate departments, specific projects, employee types (e.g. managers, staff, janitors, etc.), and the like. Each user may also define a personal taxonomy including categories of personal interest.

Each of the predefined categories may include one or more key words (or tags). In one embodiment, the categories may be defined by a plurality of keywords arranged in a predefined order, for example, a sentence or phrase. FIG. 3 illustrates exemplary categories according to an embodiment of the invention. For example, a first category 310 may be titled the "DRAM Project". The DRAM project may be a category related to a user's work in the field of Dynamic Random Access Memories (DRAMs). Accordingly, as illustrated in FIG. 3, tags for the category 310 may include key words related to DRAMs such as, for example, "memory", "RAS", "CAS", "enable signal", and "controller".

FIG. 3 also illustrates a category 320 titled "Jason's Wedding". The category 320 may be a personal category defined by the user. Exemplary tags for category 320 may include "Bride", "groom", "Christina", "Jason", "January 17$^{th}$", "groomsmen", "reception", or the like, as illustrated in FIG. 3. Furthermore, category 330 is shown with a title "Patent Application", and tags "USPTO", "office action", "rejection", "references", "Smith et. al.", or the like.

The categories shown in FIG. 3 are for illustrative purposes only, and are not limiting on the invention. Any number and types of categories with any number of tags may defined by a user. In one embodiment of the invention, the categories may be defined in a hierarchical model comprising categories and sub-categories. In such embodiments, the tags of a subcategory may also be associated with a respective parent category. The categories may also be arranged into different taxonomies, for example, an enterprise taxonomy and personal taxonomy. Personal taxonomies may be available only to a respective user, whereas an enterprise taxonomy may be globally available to a plurality of users. In some embodiments, a group taxonomy may also be defined, wherein the group taxonomy is available only to a predefined subset of a plurality of users.

In one embodiment of the invention, each tag of a category may have a respective weight value. The weight values of tags in a particular category may indicate a relative relevancy of the tags to the category. For example, the tag "USPTO" may be more relevant to the category 330 in FIG. 3 than the tag "references". Accordingly, the tag "USPTO" may be given a greater weight in comparison to the tag "references".

When an e-mail is received, the e-mail server software 234 may determine a category for the e-mail based on the tags associated with each of the predefined categories. For example, in one embodiment, the e-mail server software 234 may determine a relevancy score for each category in the predefined enterprise taxonomy. The relevancy score may indicate a probability that the e-mail belongs to a respective category.

In another embodiment, when an e-mail client application is used by users to view emails, the e-mail program 206 may determine a category for the e-mail based on the tags associated with each of the predefined categories. For example, in one embodiment, the e-mail program 206 may determine a relevancy score for each category in the predefined personal and group taxonomies. The relevancy score may indicate a probability that the e-mail belongs to a respective category.

For example, in a particular embodiment, for each category in the one or more taxonomies, the e-mail server software 234 may determine a relevancy score by determining whether one or more tags of the category are present in the body of the e-mail. The relevancy score may be calculated based on a number of tags present in the e-mail, the frequency of occurrence of a particular tag, the weights of a present tags, or like factors. Any reasonable mathematical formula combining any one or more of the factors above or other like factors may be used to determine the relevancy score.

After the relevancy score has been determined for each category, the e-mail server software 234 may assign the e-mail to a category having a relevancy score indicating the greatest correlation between the e-mail and the category. For example, if the relevancy score is determined based on a number of tags present in the e-mail body, the category having the most tags present in the e-mail may be determined to have the greatest correlation with the e-mail. Accordingly, the e-mail may be assigned to the particular category. In some embodiments of the invention, the e-mail may be associated with a plurality of the most relevant categories. For example, in one embodiment, each e-mail may be associated with the top three categories having the highest relevancy score.

FIG. 4 illustrates an exemplary e-mail box 400 displayed by an e-mail program 206, according to an embodiment of the invention. As illustrated in FIG. 4, the e-mail box 400 may include four columns 410-440. Column 410 may indicate a date on which a particular e-mail was received, column 420 may indicate the sender's name, and column 430 may indicate a subject of the e-mail, as illustrated in FIG. 4. Additionally, a column 440 is provided to indicate a category of the e-mail. The category of the e-mail may be selected from the predefined one or more taxonomies stored in the e-mail database 236. The particular category listed in column 430 may be determined by the e-mail server software 234, as described above.

In addition to the category column 430, in some embodiments, a relevancy score column 450 may also be provided, as illustrated in FIG. 4. For the purposes of this example the range for relevancy scores is assumed to be from 0 to 100, wherein a relevancy score of 100 indicates the highest relevancy and a relevancy score of 0 indicates the lowest relevancy.

In one embodiment of the invention, a user may be allowed to sort the e-mails in an e-mail box based on relevancy score. FIG. 5 illustrates the e-mails of FIG. 4 sorted according to relevancy scores in column 440. While FIG. 5 illustrates the e-mails sorted by descending relevancy score, in alternative embodiments, the e-mails may also be sorted by ascending relevancy scores. Sorting e-mails by relevancy scores may be desirable when a user wants the content of e-mails he/she accesses to have the highest likelihood of being associated with an identified category.

In one embodiment of the invention, a user may be allowed to sort the e-mails in an e-mail box based on the category names. FIG. 6 illustrates the e-mails of FIG. 4 sorted according to the category names in column 430. For the purposes of this example, it is assumed that category names are arranged in alphabetical order. Accordingly, as illustrated in FIG. 7, the e-mails related to "DRAM project" are listed first, then e-mails related to "Jason's wedding", followed by the e-mails related to "Patent Application". However, in alternative embodiments, the e-mails may also be organized in reverse alphabetical order of the category names.

In some embodiments, a user may be able to perform a combined sort using both the category names and the relevancy scores. For example, the user may be allowed to first sort the e-mails based on category name, and then sort each category based on relevancy scores. FIG. 7 illustrates the exemplary e-mail box 400 after sorting the e-mails based on both the category names and the relevancy scores. As can be seen in FIG. 7, the e-mails belonging to a particular category are grouped together. Furthermore, for the categories "Jason's wedding" and "Patent Application", the e-mails of the respective categories are listed in descending order of relevancy scores.

In one embodiment of the invention, the sorting based on category names and relevancy scores may also be combined with other sorting methods. For example, the sorting of categories and relevancy scores may be done with respect to only 'new' e-mail messages in a user's e-mail box. Alternatively, sorting based on other metadata such as sender names, subject line, etc. may be combined with the sorting methods described above. For example, a user may want to retrieve all e-mails from a particular sender that are organized in descending order of relevancy scores.

In one embodiment of the invention, a particular e-mail may be assigned to a category only if the relevancy score of the e-mail for the category is greater than a predefined threshold. For example, if the relevancy scores range from 0 to 100, an e-mail may be assigned to a given category only if the relevancy score for that e-mail is greater than 20. Any reasonable threshold may be set in alternative embodiments.

In one embodiment of the invention, if an e-mail cannot be categorized into any category in the available predefined taxonomies, the e-mail server software 234 may be configured to create a new category for the e-mail. In one embodiment, a temporary name may be given to the newly created category, for example, "Category1", Category 2" . . . "Category n", and so on. The e-mail server software may also be configured to extract one or more key words from body of the e-mail, subject line of the e-mail, or other e-mail metadata to include as tags for the newly created category.

In one embodiment of the invention, a user may be given the option to verify and edit the newly created category. For example, in one embodiment, when the user invokes the e-mail program 206, the e-mail server software program 234 may cause the e-mail program 206 to generate a GUI illustrating details of newly created categories, and respective e-mails. The user may be allowed to edit the category names, add or remove or edit tags associated with the newly created categories, or even delete a newly created category.

In one embodiment of the invention, the relevancy scores of future e-mails may be affected based on one or more user actions on currently received and classified e-mails. For example, in some embodiments, it may be desirable to monitor user's changing interests and job responsibilities to enable the e-mail server software to generate more accurate classifications and relevancy scores for future e-mails. For example, in one embodiment of the invention, if a user replies to an e-mail in a certain category (for example, "DRAM project"), it may indicate that the e-mail contains information highly relevant to the "DRAM project". Accordingly, the content of the e-mail may be used to modify the "DRAM project" category such that future e-mails including similar content have a high relevancy score.

For example, in some embodiments, the weights of tags in the e-mail that are also present in the category "DRAM project" may be updated to reflect a higher correlation between the tags and the category. In some embodiments, one or more key words from the e-mail may be added to the category "DRAM project" as a new tag. The changes made to the category "DRAM project" may affect the relevancy score of a future e-mail that may be categorized as "DRAM project".

On the other hand, if an e-mail categorized as "DRAM project" is deleted, it may indicate that the e-mail is not relevant to the "DRAM project" or that the user is no longer interested in the "DRAM project" category. Accordingly, the "DRAM project" category may be modified such that future e-mails with similar content do not have a high relevancy score. For example, in some embodiments, the weights of tags in the e-mail that are also present in "DRAM project" may be adjusted to reflect a lower relevancy. By dynamically adjusting the categories, embodiments of the invention allow the e-mail server software 234 to adjust to changing user interests.

Any number and types of user actions may cause the e-mail server software to adjust the categories. The actions of the e-mail server software 234 to adjust the categories may generally be categorized as providing positive feedback and providing negative feedback. Positive feedback may involve actions that result in future similar e-mails having higher relevance scores. Replying to an e-mail, as described above, may result in a positive feedback. Negative feedback may be actions that result in similar future e-mails having a lower relevancy score. Deleting an e-mail may result in negative feedback.

In one embodiment, archiving an e-mail into a folder may cause the e-mail server software 234 to provide positive feedback to the predefined taxonomies. For example, the weight values of one of more tags in the archived e-mail may be adjusted to reflect a stronger relationship between the tags and a respective category. In another embodiment, lack of user interaction with an e-mail for a predefined period of time may cause the e-mail server software 234 to provide negative feedback to the predefined taxonomies. For example, in one embodiment, the e-mail server software program may adjust the weights of one or more tags in the e-mail to reflect a weaker relationship between the tags and a respective category.

Figure 8:
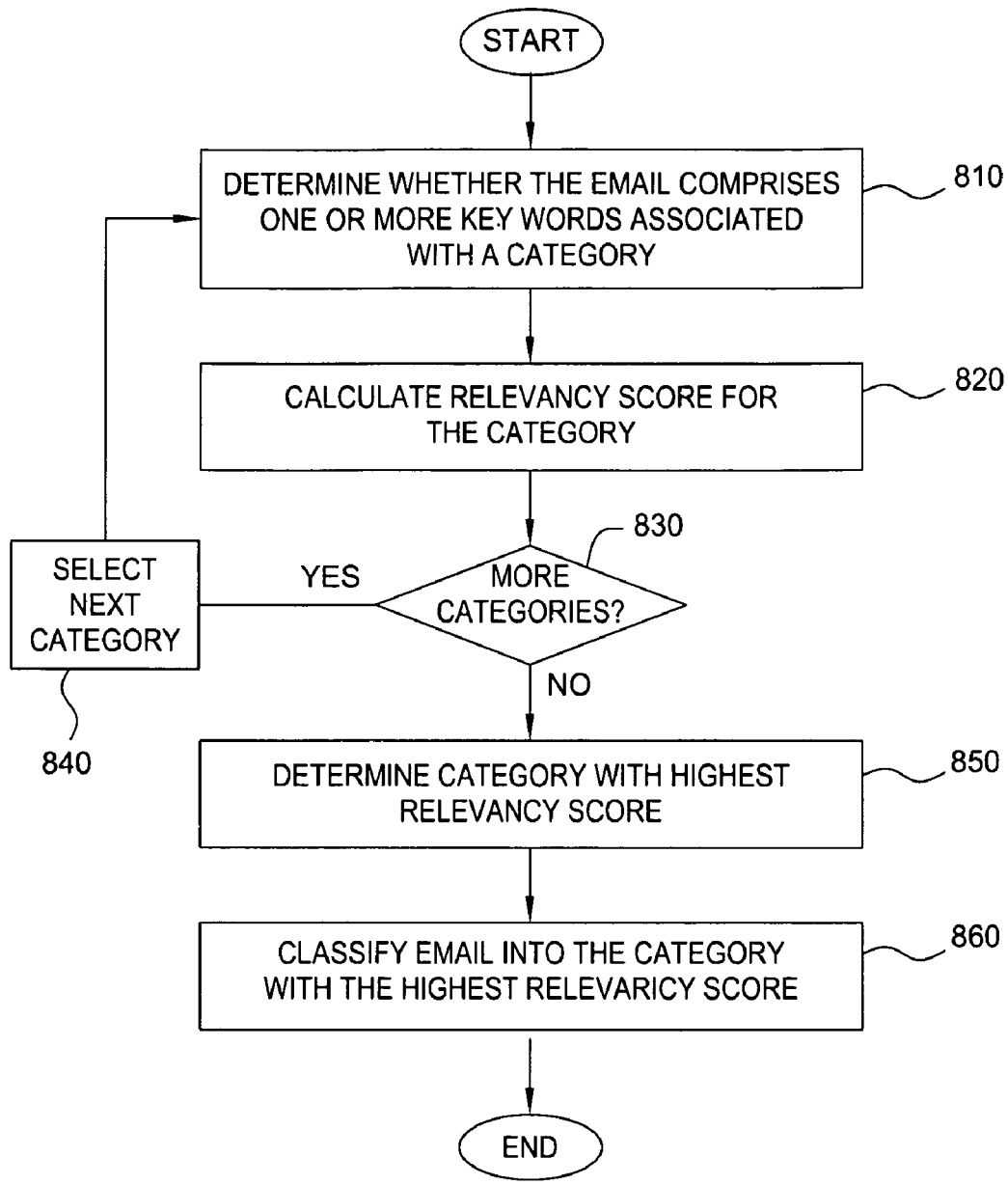
FIG. 8 is a flow diagram of exemplary operations performed to classify an e-mail, according to an embodiment of the invention.

FIG. 8 illustrates an exemplary flow diagram of exemplary operations performed by an e-mail server software 234 to classify an e-mail, according to an embodiment of the invention. The operations may begin in step 810 by determining whether the e-mail includes one or more key words associated with a category selected from a predefined taxonomy. In step 820, the e-mail server software 234 may calculate a relevancy score for the category. The relevancy score may be calculated based on one or more tags of the category that are found in the e-mail.

In step 830 the e-mail server software 234 may determine whether there are more categories in the predefined taxonomy. If more categories are present, in step 840, the e-mail server software 234 may select a next category and repeat steps 810 and 820. If no more categories exist in the taxonomy, in step 850, the e-mail server software 234 may determine a category having the highest relevancy score. Then in step 860, the e-mail server software 234 may classify the e-mail into the category with the highest relevancy score.

In some embodiments, multiple taxonomies such as for example, a personal taxonomy, enterprise taxonomy, group taxonomy, and the like may exist. Accordingly, the flow diagram of FIG. 8 may be modified such that a category having the highest relevancy score s selected from any one of the multiple taxonomies.

In one embodiment of the invention, the taxonomies may be used in conjunction with one or more other system programs. For example, in one embodiment, the user may also have access to a calendar program to store dates and times about important meetings and events. The user may be allowed to tag his events in the calendar program using predefined taxonomies. In one embodiment of the invention, the e-mail server software 234 may be configured to adjust the relevancy scores based on a temporal proximity between a date/time that an e-mail is received and the date/time of a similarly categorized event in the user's calendar program.

In one embodiment of the invention, the taxonomies may be used to automatically deduce list recipients for an email. For example, in one embodiment, when a user composes an email, the e-mail program 206 may leverage the personal and group taxonomies to derive category name and relevancy score for the email. If the relevancy score for a category is greater than a predefined threshold, the e-mail program 206 may populate a list of email addresses having a predefined association with the category. In such embodiments, in addition to the taxonomies, the e-mail program 206 may maintain an association database with categories mapped to a list of email addresses.

By providing a method for classifying e-mails based on the content of the e-mails, embodiments of the invention allow users to quickly and efficiently identify crucial e-mails in long lists of e-mails that may include irrelevant or undesired e-mails.

While the foregoing is directed to embodiments of the present invention, other and further embodiments of the invention may be devised without departing from the basic scope thereof, and the scope thereof is determined by the claims that follow.

What is claimed is:

1. A computer-implemented method for classifying an electronic message, comprising:
configuring one or more computer processors with an electronic message program to perform an operation comprising:
providing access to a predefined list of categories, wherein each of the categories has a predefined association with a respective one or more key words, and wherein each of the one or more key words has an associated weight value reflecting a correlation between the respective key word and the category;
for each category in the predefined list of categories, calculating, by operation of one or more computer processors, a relevancy score based on the one or more key words found in a body of the electronic message, wherein the relevancy score reflects a correlation between the electronic message and the category;
associating the electronic message with a category from the predefined list of categories having a strongest correlation with the electronic message based on the calculated relevancy scores; and
responsive to detecting a user action associated with the electronic messages, adjusting at least one of the associated weight values for at least one of the keywords found in the body of the electronic message and having the predefined association with the determined category having the strongest correlation, wherein the detected user action comprises at least one of replying to the electronic message, archiving the electronic message, and deleting the electronic message.

2. The method of claim 1, wherein the operation further comprises:
displaying the category of the electronic message along with categories of a plurality of other classified electronic messages in an electronic message box;
receiving a request to sort the electronic messages in the electronic message box based on respective categories; and upon receiving the request, sorting the electronic messages in the electronic message box based on respective categories.

3. The method of claim 1, wherein the operation further comprises:
displaying the relevancy score of the electronic message along with relevancy scores of a plurality of other classified electronic messages in an electronic message box;
receiving a request to sort the electronic messages in the electronic message box based on respective relevancy scores; and
upon receiving the request, sorting the electronic messages in the electronic message box based on respective relevancy scores.

4. The method of claim 1, wherein the at least one of the associated weight values is adjusted to strengthen the correlation between the respective key word and the category upon detecting the user action.

5. The method of claim 1, wherein the at least one of the associated weight values is adjusted to weaken the correlation between the respective key word and the category upon detecting the user action.

6. The method of claim 1, wherein the electronic message is an e-mail.

7. The method of claim 1, wherein the detected user action has a predefined influence on a strength of the at least one of the associated weight values.

8. A computer program product for classifying electronic messages, the computer program product comprising a computer readable storage medium having computer usable program code configured for:
providing access to a predefined list of categories, wherein each of the categories has a predefined association with a respective one or more key words, and wherein each of the one or more key words has an associated weight value reflecting a correlation between the respective key word and the category;
for each category in the predefined list of categories, calculating a relevancy score based on the one or more key words found in a body of the electronic message, wherein the relevancy score reflects a correlation between the electronic message and the category;
associating the electronic message with a category from the predefined list of categories having a strongest correlation with the electronic message based on the calculated relevancy scores; and
responsive to detecting a user action associated with the electronic messages, adjusting at least one of the associated weight values for at least one of the keywords found in the body of the electronic message and having the predefined association with the determined category having the strongest correlation, wherein the detected user action comprises at least one of replying to the electronic message, archiving the electronic message, and deleting the electronic message.

9. The computer program product of claim 8, wherein the operation further comprises:
displaying the category of the electronic message along with categories of a plurality of other classified electronic messages in an electronic message box;
receiving a request to sort the electronic messages in the electronic message box based on respective categories; and
upon receiving the request, sorting the electronic messages in the electronic message box based on respective categories.

10. The computer program product of claim 8, wherein the operation further comprises:
displaying the relevancy score of the electronic message along with relevancy scores of a plurality of other classified electronic messages in an electronic message box;
receiving a request to sort the electronic messages in the electronic message box based on respective relevancy scores; and
upon receiving the request, sorting the electronic messages in the electronic message box based on respective relevancy scores.

11. The computer program product of claim 8, wherein the at least one of the associated weight values is adjusted to strengthen the correlation between the respective key word and the category upon detecting the user action.

12. The computer program product of claim 8, wherein the at least one of the associated weight values is adjusted to weaken the correlation between the respective key word and the category upon detecting the user action.

13. The computer program product of claim 8, wherein the electronic message is an e-mail.

14. The computer program product of claim 8, wherein the detected user action has a predefined influence on a strength of the at least one of the associated weight values.

15. A system, comprising:
a memory comprising an electronic message program; and
at least one processor which, when executing the electronic message program is configured to:
providing access to a predefined list of categories, wherein each of the categories has a predefined association with a respective one or more key words, and wherein each of the one or more key words has an associated weight value reflecting a correlation between the respective key word and the category;
for each category in the predefined list of categories, calculating a relevancy score based on the one or more key words found in a body of the electronic message, wherein the relevancy score reflects a correlation between the electronic message and the category;
associating the electronic message with a category from the predefined list of categories having a strongest correlation with the electronic message based on the calculated relevancy scores; and
responsive to detecting a user action associated with the electronic messages, adjusting at least one of the associated weight values for at least one of the keywords found in the body of the electronic message and having the predefined association with the determined category having the strongest correlation, wherein the detected user action comprises at least one of replying to the electronic message, archiving the electronic message, and deleting the electronic message.

16. The system of claim 15, wherein the processor is further configured to:
display the category of the electronic message along with categories of a plurality of other classified electronic messages in an electronic message box;
receive a request to sort the electronic messages in the electronic message box based on respective categories; and
upon receiving the request, sort the electronic messages in the electronic message box based on respective categories.

17. The system of claim 15, wherein the processor is further configured to:

display the relevancy score of the electronic message along with relevancy scores of a plurality of other classified electronic messages in an electronic message box;

receive a request to sort the electronic messages in the electronic message box based on respective relevancy scores; and upon receiving the request, sort the electronic messages in the electronic message box based on respective relevancy scores.

18. The system of claim 15, wherein the processor is further configured to adjust the weight value to strengthen the correlation between key word and the category upon detecting the user action.

19. The system of claim 15, wherein the processor is further configured to adjust the weight value to weaken the correlation between key word and the category upon detecting the user action.

20. The system of claim 15, wherein the electronic message is an e-mail.

21. The system of claim 15, wherein the detected user action has a predefined influence on a strength of the at least one of the associated weight values.

* * * * *